(12) United States Patent
Gordon

(10) Patent No.: US 6,297,481 B1
(45) Date of Patent: Oct. 2, 2001

(54) INFRARED FOOD WARMER

(76) Inventor: Lawrence Gordon, P.O. Box 48334, Watauga, TX (US) 76148

( * ) Notice: Subject to any disclaimer, the term of this patent is extended or adjusted under 35 U.S.C. 154(b) by 0 days.

(21) Appl. No.: 09/204,407

(22) Filed: Dec. 2, 1998

(51) Int. Cl.[7] ............................. A21B 1/00; A21B 1/22; F27D 11/00
(52) U.S. Cl. ................... 219/406; 219/411; 392/435
(58) Field of Search ............................. 219/386, 387, 219/388, 406, 464, 407; 99/331, 339, 386; 34/203, 208; 165/918, 919; 312/236; 392/432, 435, 418

(56) References Cited

U.S. PATENT DOCUMENTS

| | | | |
|---|---|---|---|
| 3,626,155 | * 12/1971 | Joeckel | 219/411 |
| 3,760,155 | * 9/1973 | Polansky | 219/399 |
| 3,886,346 | * 5/1975 | Meyers | 219/386 |
| 3,961,157 | * 6/1976 | Miller et al. | 392/435 |
| 3,974,358 | * 8/1976 | Golsos | 219/387 |
| 4,250,398 | * 2/1981 | Ellis et al. | 219/549 |
| 4,404,898 | * 9/1983 | Chaudoir | 99/331 |
| 4,700,051 | * 10/1987 | Goessler et al. | 219/464 |
| 4,839,502 | * 6/1989 | Swanson et al. | 219/401 |
| 5,023,429 | * 6/1991 | Bailey et al. | 219/388 |
| 5,182,438 | * 1/1993 | Oakes et al. | 219/386 |
| 5,608,383 | * 3/1997 | Neil | 340/588 |
| 6,067,404 | * 5/2000 | Wilkins et al. | 392/435 |

* cited by examiner

*Primary Examiner*—Teresa Walberg
*Assistant Examiner*—Leonid Fastovsky
(74) *Attorney, Agent, or Firm*—John W. Montgomery; Haynes and Boone, L.L.P.

(57) ABSTRACT

An infrared food warming device is provided with one or more compartments having one or more food shelves. Food may be placed through an opening on such a food shelf in the compartment. An infrared energy generating sheet is positioned in the compartment on or adjacent to the food shelf. The infrared energy sheet includes a fiberglass support grid, a layer formed on support grid from a mixture of carbon and polymeric materials capable of producing infrared radiation in response to electrical current passed there through. A pair of electrical conduction power strips are attached along opposite sides of the layer and are attached to input power terminals to provide the required current. A polymeric laminate encloses the support grid, the layer and the electrical conduction power strips. The polymeric laminate is substantially transparent to infrared radiation so that it does not become excessively heated. An electrical power source is connected to the input power terminals for providing electrical power to be passed through the power strips and the layer of carbon and polymer mixture to generate infrared radiation that passes through the polymeric laminate and penetrates into the food on the shelf so that the food is warmed.

10 Claims, 4 Drawing Sheets

INFRARED FOOD WARMER

TECHNICAL FIELD OF THE INVENTION

The present invention relates to food warming devices, namely food warming devices for maintaining prepared hot food at a required elevated temperature for food safety and for improving the palatability of the food, and more particularly the invention relates to stationary and transportable food warming devices and compartments having electricity powered thin sheet infrared radiation (IR) elements constructed for keeping food warm without producing excessive compartment surface temperatures so that the risk of burns is reduced for users of the food warming device.

BACKGROUND OF THE INVENTION

In many industrialized countries throughout the world the number of meals prepared and consumed outside of the home has steadily increased and is now estimated to exceed the number of meals prepared in the home. Many restaurants have been established to prepare, serve and/or deliver hot food to consumers. Particularly, significant for modern food consumption of prepared food are establishments known as fast food restaurants. Popular hot foods such as fried chicken, hamburgers, pizzas, and tacos are among some of the "staples" of the fast food industry. Purposes of cooking food and serving it hot are the same for home cooking, restaurants and fast food restaurants and include killing potentially harmful bacteria and certain viruses, terminating the growth of such potentially harmful microbes, and enhancing the flavor or otherwise improving the palatability of food.

Many devices have been designed to keep prepared food warm including metal containers heated with gas flames, electrical resistance coils, steam or other heat sources that rely primarily upon heat conduction through the metal container to keep the food warm. Those devices invariably result in hot exposed surfaces and generally require that the food be dished out of the container prior to serving. Such heat conduction warming devices are not well suited for transporting the food. Also, in the fast food industry, it is generally preferred to provide the food in individual entre containers or in individual serving size containers that are light weight and disposable. Typically such disposable food containers can be made of paper, cardboard or other materials that are not well suited for conductive warming.

It has been found that many of the types of "fast foods" that are desirably prepared in advance, cooked at high temperatures exceeding 160° F. and kept warm at above about 120° F. until the food is ordered at a restaurant, handed to a carry out customer or otherwise delivered, are also well suited for warming using infrared radiation. Currently warming is accomplished with infrared lamps, typically aimed from above at the precooked food on a shelf or in a holding area. For example, pizzas, tacos, hamburgers, or fried chicken may be place on a stainless steel counter-top or shelf with one or more infrared lamps aimed at the area to keep the cooked products warm until it is carried to a restaurant customer for consumption, picked up or delivered. The prepared hot food might also be placed in a buffet type covered serving area with infrared lamps spaced above to keep the food warm while the serving line is available. Hot prepared food is often packaged hot in a cardboard container, in paper wrapping or in a paper bag to be handed to the customer or to be carried by a delivery driver to a telephone ordering customer for consumption off the premisses.

Infrared heat lamps as, with conductive heating, can serve to keep food warm but there are certain drawbacks and shortcomings that result in practical situations. For example, the counter-top or shelf or other surface that serves to hold the food also become heated and can become hot enough to cause burns when touched by people. Also the lamps are typically constructed of colored glass bulbs shielded on the sides but exposed downward or upward to allow the food to receive the infrared radiation. The exposed surface in a food serving area requires cleaning. It has been found that this is a task often delegated to new or inexperienced workers who can unknowingly apply a damp cleaning cloth to the hot glass surface or directly apply a wet cleaning solution thereto while the lamp is on or after it is turned off but before it has completely cooled. The localized cooling and contraction of the lamp surface can cause the bulb to shatter thus creating a dangerous situation sometimes resulting in injury and invariably resulting in a significant amount of lost time, effort and expense to clean the broken glass, to replace the lamp and to replace any food that might have been contaminated with bits of broken glass.

Moreover an infrared lamp warming apparatus requires a durable structure having a significant size that is not well adapted for transportation as in a mobile delivery vehicle.

Other know infrared heating devices with metal electric resistance elements also suffer from size and structural limitations as well as risk of burning from contact with the elements or from absorption of heat by metallic food holding shelves.

SUMMARY OF THE INVENTION

The present invention overcomes many of the drawbacks of the prior fast food warming devices by providing a food warming compartment into which prepared hot food may by conveniently placed and retrieved. The food is warmed and maintained at a desired safe temperature with one or more infrared radiation generating elements covered with an infrared transmitting surface material that does not become excessively heated by the Infrared radiation. The surface temperature is well below the safe food cooking temperature of 160° F. in all the areas of the compartment, inside and out, wherever surfaces of the compartment might be inadvertently touched. The food receives the energy of the Infrared radiation and becomes heated to the desired temperature. The infrared energy element(s) comprise(s) a mixture of materials formed into an infrared radiation generating layer on a woven fiberglass support grid. In one embodiment the mixture of materials comprises carbon (graphite) and polymer (Teflon) with metal electrical power strips spaced apart along opposed sides. The power strips are connected to an electrical power supply to activate the material mixture to generate infrared radiation emanating from the entire area of the infrared radiation (IR) element sheet. The IR element sheet is encased or laminated between layers of a high temperature polymer that is substantially transparent to infrared radiation. One or more laminated infrared generating elements are secured across the bottom, top and/or side walls of the food warming compartment. The IR elements are thus covered with a IR transmitting covering material so the infrared energy is transmitted to food in the compartment, but the surface of the compartment do not become heated by the energy from the IR elements to a temperature that is likely to burn users of the food warming device. To maintain the desired food temperature, a self limiting heating element is advantageously provided. The percentage composition of the infrared generating layer, and the size of the element can be constructed to work with a power source having a specific voltage to maintain a preselected temperature for a particular type, size and volume of the food to be warmed in a particular food warmer. Alternatively, a temperature control miro-chip is advantageously connected to the infrared element sheet to turn the power on or off at preprogramed temperature settings.

BRIEF DESCRIPTION OF THE DRAWINGS

The foregoing objects, advantages, and features, as well as other objects and advantages, will become more apparent with reference to the description and drawings below, in which like numerals represent like elements and in which.

DETAILED DESCRIPTION OF THE PREFERRED EMBODIMENTS

Figure 1:
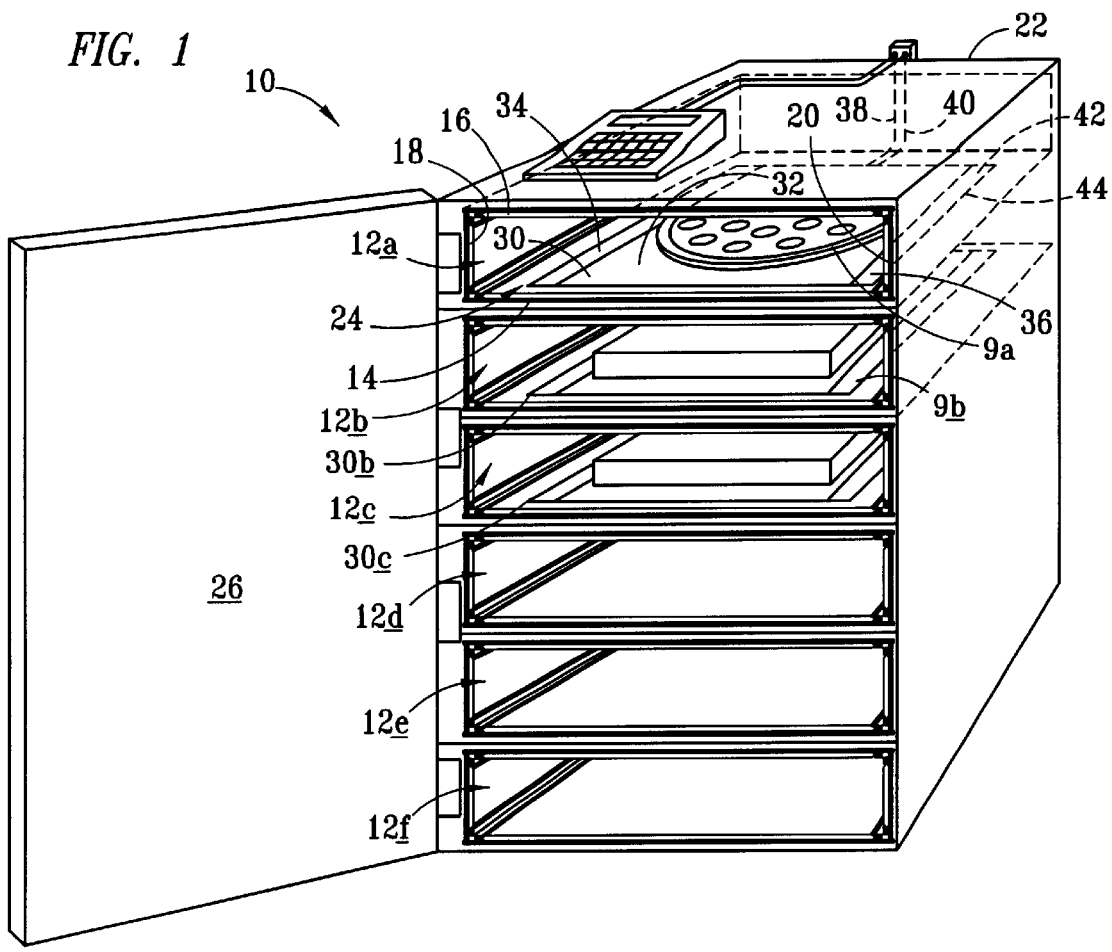
FIG. 1 is a schematic front perspective view of a multiple compartment infrared warming device according to one embodiment of the invention.

FIG. 1 shows a schematic front perspective view of a multiple compartment infrared warming device 10 according to one embodiment of the present invention. In this embodiment there are six compartments 12a–b, each compartment comprising at least one food shelf 14 and an access opening 24. In the embodiment depicted the compartment is further defined by a top 16 left side 18 right side 20 and back 22. The front access opening 24 may also be provided with a closure 26 such as a hinged door 26. Through access opening 24 foods such as a pizza 9a to be warmed may be inserted advantageously a pizza in a box 9b may be inserted into any of the plurality of compartments 12 as schematically depicted in compartment 12b. Each compartment is provided with at least one infrared sheet 30. The infrared sheet 30 comprises an infrared generating layer 32 a pair of electrical power strips 34 and 36 along opposite sides of the infrared generating layer 32 and input power wires 38 and 40. The unique construction of the infrared generating layer, the power strips, the input power wires and the temperature limiting micro-chip circuit are advantageously laminated between high temperature polymer layers 42 and 44, as will be discussed more fully below with reference FIGS. 4 and 5.

Figure 2:
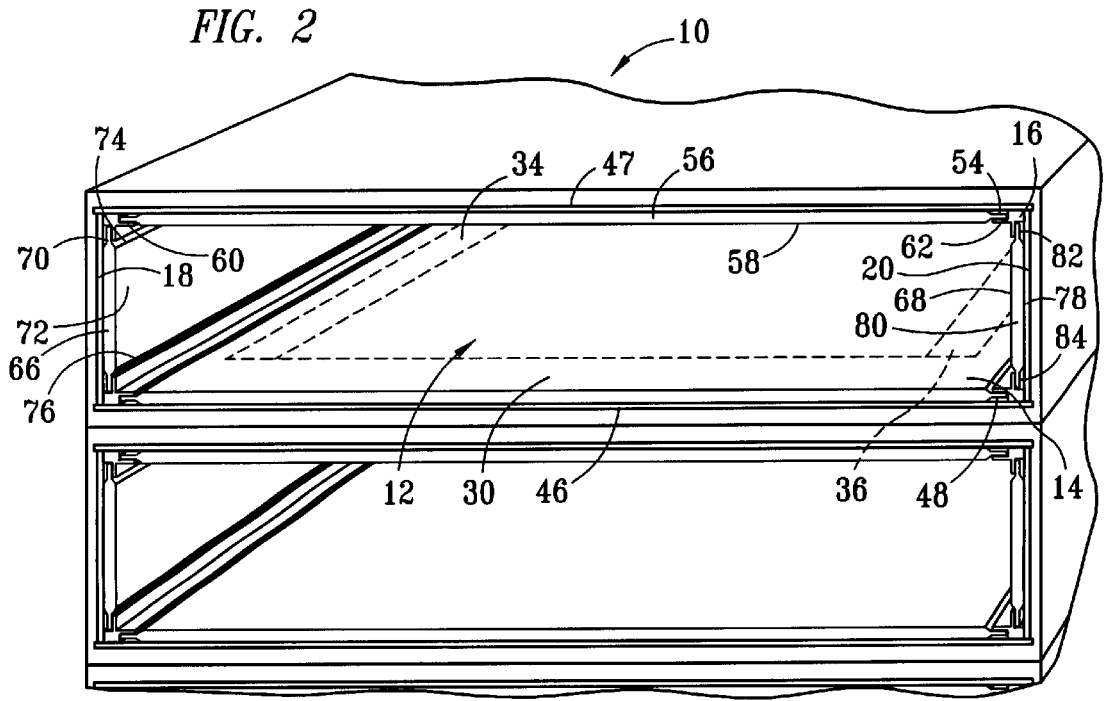
FIG. 2 is a schematic back view of the multiple compartment infrared warming device of FIG. 1.

FIG. 2 shows a schematic front elevation view of a plurality of compartments in which each compartment is constructed for holding one or more infrared radiation generating sheets in a plurality of possible positions in the compartment 12. For example a bottom infrared heat generating sheet 30 is held in a bottom channel 48 formed along shelf 14 of compartment 12 with guide rails 50 and 52. A top channel 54 may be constructed for holding a top infrared generating sheet 56. A top channel 54 may be an additional cover constructed of a continuous thin piece of infrared transmitting material such as a sheet of high temperature plastic 58 secured and along side mounts 60 and 62 at the top 16 of the compartment 12. Interposed between the top infrared generating sheet 56 and the top 16 of the compartment 12 may be a thin infrared reflecting material 47 such as a "polished" metallic foil designed to reflect infrared radiation back through the IR generating sheet and into the compartment 12. Similarly a reflective foil sheet 46 may be placed and between infrared sheet 30 and along the food shelf 14 at the bottom of compartment 12. Side infrared generating sheets 66 and 68 may also be provided along left wall 18 and right wall 20. The left side IR generating sheet 66 may be inserted parallel to and along left wall 16 in a channel 70. Channel 70 may be formed of an infrared transmitting material 72 attached along the top and bottom of wall 18 as at 74 and 76. The right side infrared generating sheet may be advantageously held in a channel 78 formed of an infrared transmitting cover material 80 attached along tops and bottoms of right side wall 20 as at 82 and 84. As will be discussed more fully below with respect to the construction of the infrared generating sheet 30 with or without an additional cover forming channel, the surface of the infrared generating sheet is a high temperature plastic material such as a high temperature Mylar designed for transmitting infrared radiation therethrough. This material is therefore not subject to undue heating by the infrared radiation which is transmitted directly to the food to be warmed. A bottom cover of another layer of infrared radiation transmitting material may be held overlaying the infrared radiation generating sheet 30. As with the other top and side cover materials, this bottom cover serves to further provide a surface inside the compartment 12 that is designed to transmit infrared radiation without becoming excessively heated thereby. This provides surfaces inside the compartment that do not become excessively heated by the infrared radiation and therefore do not cause burning to one's skin upon inadvertent contact when inserting or retracting food to and from the compartment. The infrared elements 30, 56, 66 and 68 according to the present invention may be held in channel forming guide rails 50, 52, 54, 60, 74, 76, and 78 without covers as depicted for channel 46 at the bottom of compartment 12 to obtain certain advantages of less material, simplicity of construction and lower cost. In an alternative embodiment the covers 58, 72, and 80 may be used to obtain other advantages of further reducing the surface temperature. Covers may be constructed of a rigid material to provide the support channels and alternatively they may also be constructed of a non-rigid material particularly where the side attachments or guide rails defining the channels 54, 70 and 78 are advantageously attached to the rigid top, bottom and side walls to properly support the infrared radiation generating sheets 30, 56, 66, and 68.

Figure 3:
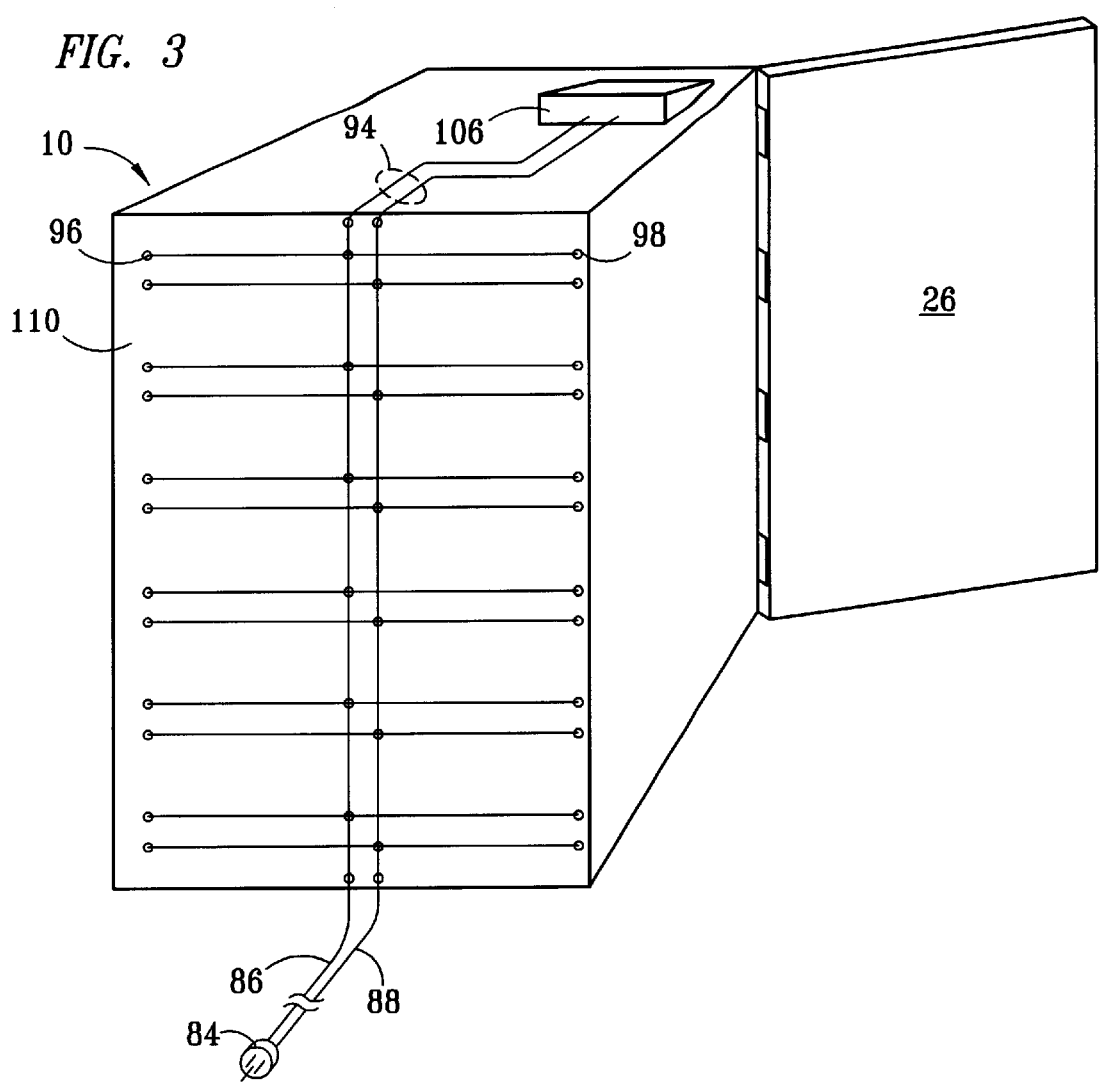
FIG. 3 is a schematic view of a compartment comprising a plurality of channels for holding infrared heating elements in position at the bottom, top, or sides of the compartment.

FIG. 3 is a schematic back view of the multiple compartment infrared warming device 10 of FIG. 1. The schematic embodiment of the back view depicted in FIG. 3 further depicts appropriate input power wiring for providing the multiple infrared generating sheets as in FIG. 2. A basic power supply 84 such as an electrical connector plug with input power conductors 86 and 88 extending along the back of the shielded conduit 90. Conductors 86 and 88 are connected at connector nodes 92, 94, 96 and 98 to each of the infrared radiation generating sheets 30a–f and to any of the other infrared generating sheets 56a–f, 66a–f or 68a–f as may be present in the particular embodiment of the infrared heating device 10.

Figure 4:
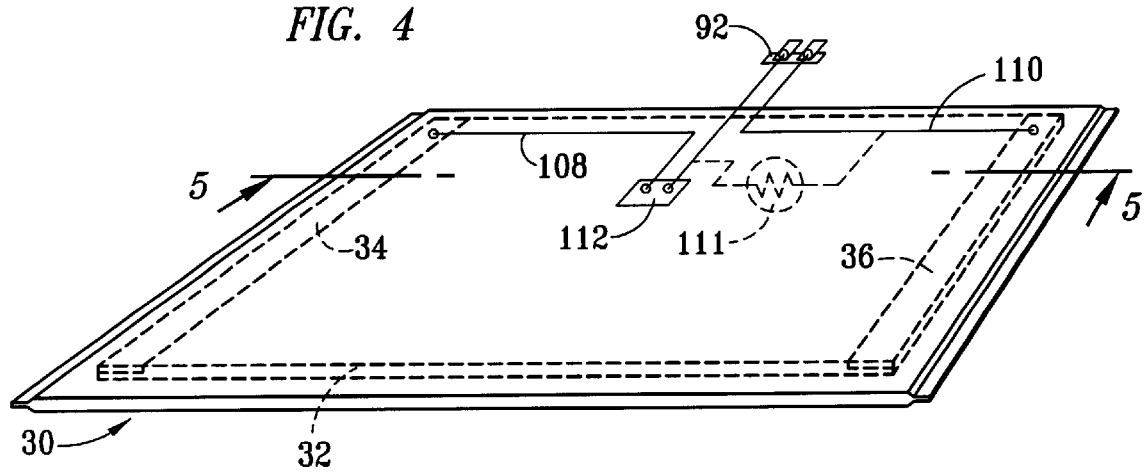
FIG. 4 is a schematic perspective view of an infrared heating element according to the invention.
Figure 5:
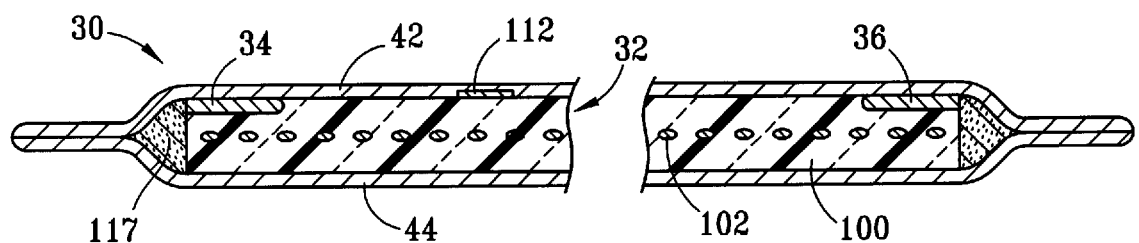
FIG. 5 is a cross-section of the infrared radiation heating element of FIG. 4 taken along section line 5—5.

With reference to the perspective view shown in FIG. 4 and the cross-sectional view of FIG. 5, the unique construction of an infrared radiation generating element 30 according to the present invention may be more fully understood. The infrared radiation generating element 30 depicted in FIG. 4 shows a sheet structure including an infrared generating layer 32 of a carbon and polymer mixture 100, preferably graphite and Teflon, that is capable of generating infrared radiation upon the application of an electrical current through the mixture layer 100. The infrared generating mixture of graphite and Teflon is formed under heat and pressure into a sheet that is embedded onto a fiberglass support grid 102. Along opposite sides of the graphite Teflon mixture layer 100 are conductor strips 34 and 36. The conductor strips are coupled through wires 38 and 40 and electrical connector 92 to the input power conductors 86 and 88. The connection is conveniently made through the back 104 of the infrared warming device 10 as depicted in FIG. 2.

The power to one or more of the IR element sheets 30 in the various compartments 12 may be controlled with a control panel 106, shown in FIGS. 1 and 2, such as a numeric key pad and appropriate electronic circuitry. In one alternative embodiment, as shown in phantom lines in FIG. 4, an adjustable thermostat 111 may be controlled with the key pad 106 and coupled to a temperature sensor in the compartments 12 with the IR elements 30 to adjustably control the IR heating for food in any of the compartments 12, with the control of each compartment either individually or as one or more groups as desired. A suitable temperature control thermostat 111 for this purpose is available from Portage Electric of Camadon Ohio part #C-103205. In another embodiment, alternatively depicted with solid lines as the preferred embodiment in FIG. 4, an automatic temperature control microchip 112 is operatively connected for sensing the temperature of the surface of the infrared radiation generating sheet 30. The microchip is responsive to a predetermined temperature to turn the power "on" when the temperature is below a predetermined level and to turn the power "off" when the temperature is above the predetermined temperature. The microchip may be obtained from IBM or Texas Instruments and can be preprogrammed to operate at a preselected "on" and "off" temperature. One such micro-chip is available from Infra Texnology, Inc., Watauga, Tex. as part number LOG16242. The entire assembly is then encased or laminated into a high temperature plastic material 114. The plastic material 114 may be comprised of an upper layer 116 and a lower layer 118 of high temperature Mylar that may be laminated together under heated pressure so that high temperature glue 117 sealingly encloses the infrared generating layer and power strip and conductor wire and possibly even the temperature control microcircuit to form the infrared generating sheet 30. The infrared generating sheet 30 with the high temperature Mylar on the exterior thereof which high temperature Mylar is designed to transmit infrared radiation without absorbing an excessive amount of the heat.

Figure 6:
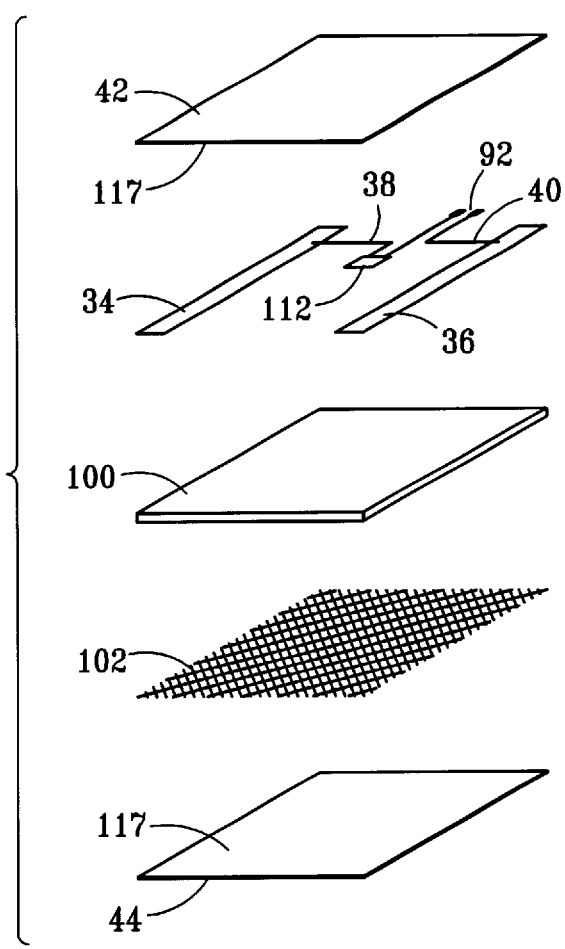
FIG. 6 is a schematic exploded assembly view of the heating element of FIG. 4.

High temperature Mylar sheets with lamination glue that melts at about 350° F. and bonds .upon cooling can be obtained from General Binding Corporation of Chicago, Ill. Reference to FIGS. 5 and 6 further shows the unique construction of the IR energy sheet. FIG. 5 is a cross-section of the infrared generating sheet of FIG. 4 taken along section line 5—5. FIG. 6 is an exploded assembly view of the infrared radiation generating sheet useful in accordance with the present invention.

Figure 7:
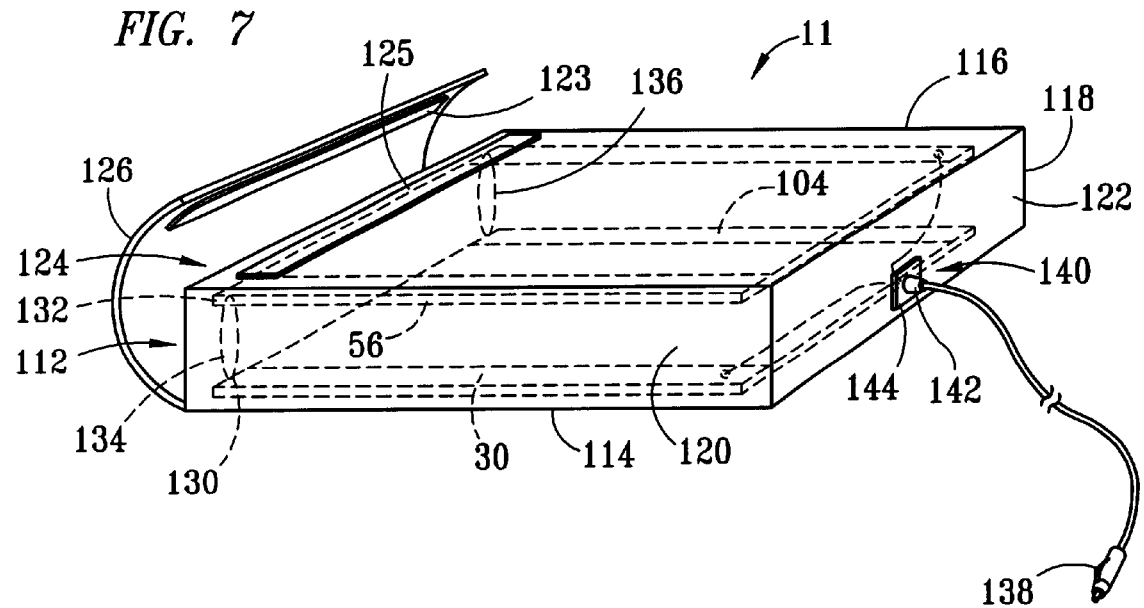
FIG. 7 is a schematic perspective view of a transportable single compartment alternative embodiment of an infrared food warming device according to the present invention.

FIG. 7 is a schematic prospective view of an alternative embodiment of a infrared food warming device comprising a transportable single compartment infrared food warming device according to one aspect of the present invention. The alternative embodiment transportable food warmer 11 comprising a compartment 112 having a food shelf 114, a top 116, sidewall 118, sidewall 120 and back 122 and a closure 126 such as a flexible door 26 attached for covering front access opening 124. The flexible door 126 may be releasably fastened in a closed position with suitable matting fasteners 123 and 125 such as hook and loop fastening strips. The top and bottom may be constructed, as shown by hidden lines, having elongated substantially flat channels 130 and 132 formed there along for receiving an infrared heating element 30 along the food shelf 114 at bottom of the compartment and an infrared heating element 56 along the top of the compartment 112. Also side channels 134 and 136 may be provided for receiving side infrared generating element sheets 66 and 68 (not shown in FIG. 7 for clarity). Again the input power to the heat generating elements may be a 12 volt battery, such as an automotive battery. A power conductor can be extended through a plastic wire holding grommet 140 shown on to the back 122 of the compartment of transportable IR food warming device 11. Such a wire holding grommet 140 has been found to be useful for preventing the power cord from becoming pulled loose from the IR element 30. One grommet 140 useful for this purpose is known as a Granmet #64-3025 manufactured for the Tandy Corporation.

Figure 8:
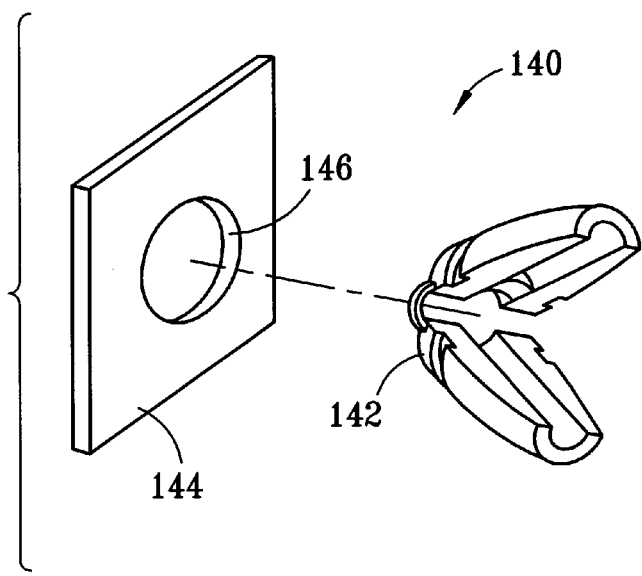
FIG. 8 is a schematic view of a cord connector beneficial useful for the transportable infrared food warming device of FIG. 7.

FIG. 8 shows the details of construction of another uniquely constructed connector 142 designed to hold the wire securely to the back or side of the compartment shown in FIG. 7. This device includes a bifurcated hinged clamp 142 that slides over the input power wire 92 and a support plate 144 that has a flat base to be permanently attached to the back of the compartment and having an oval shaped orifice 146 to lockingly engage the clamp 142 with the wire 92 rigidly held therein. A standard automotive battery power source may be accessed through a cigarette lighter connection 138 to provide electrical power to the transportable food warming device 11. The entire interior surface of the transportable IR food warming device 11 may be constructed of infrared transmitting material and sheets of reflective metallic material 46 may be interposed between the heating elements 30 in the channels 130 and 132 and the exterior of the compartment so that the infrared radiation is radiated primarily directly inward. The food and not the exterior surface of the portable warming device becomes heated by the infrared radiation. Each element may be advantageously constructed with a temperature limiting microchip such that the power to the infrared radiation generating device is turned off when the temperature inside of the compartment exceeds a predetermined temperature setting.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. An infrared food warming device comprising:
   (a) at least one compartment having at least one food shelf and at least one opening for placing food to be warmed on said food shelf in said compartment;
   (b) at least one infrared energy generating sheet positioned in said compartment adjacent to said at least one food shelf, said infrared energy sheet further comprising:
      i) a fiberglass support grid;
      ii) a layer formed on said support grid, said layer comprising a mixture of carbon and polymeric materials capable of producing infrared radiation in response to electrical current passed therethrough;

iii) a pair of electrical conduction power strips along opposite sides of said layer;

iv) a polymetric laminate enclosing said support grid, said layer and said electrical conduction power strips, said polymetric laminate being substantially transparent to infrared radiation;

v) input power terminals connected to said electrical conduction power strips; and (c) an electrical power source connected to said input power terminals for providing electrical power to be passed through said power strips and said layer of carbon polymer mixture to generate infrared radiation therefrom.

2. An infrared food warming device as in claim 1 further comprising:

(a) a plurality of compartments each having at least one food shelf and an opening;

(b) a plurality of infrared energy generating sheets operatively positioned adjacent each food shelf in each of said plurality of compartments.

3. An infrared food warning device as in claim 1 further comprising a temperature control device for automatically terminating power to said power conducting strips when a temperature in said compartment exceeds a predetermined temperature, no higher than about 160° F.

4. An infrared food warming device as in claim 3 wherein said temperature control device comprise a microchip circuit sensitive to a preselected temperature and connected to said input power for turning power "on" below said preselected temperature and "off" above said preselected temperature.

5. An infrared food warming device as in claim 1 wherein said compartment further comprises:

(a) said food shelf and said heating element forming a bottom of said compartment; and (b) a top of said compartment spaced above said bottom and having another infrared radiation generating sheet positioned along said top for heating food on said shelf from above.

6. An infrared food warming device as in claim 5 further comprising at least one side wall extending between said bottom and said top of said compartment; and an additional infrared heat generating sheet positioned along said at least one side wall.

7. An infrared food warming device as in claim 1 further comprising:

(a) a thermostat connected in said compartment for sensing a temperature indicative of the temperature of said food to be warmed; and (b) a control circuit connected to said thermostat and said infrared heating element for controlling power to said infrared heating element so that a predetermined temperature range is maintained in said compartment, wherein said predetermined temperature does not exceed about 160° F.

8. An infrared food warming device as in claim 7 wherein said control circuit comprises a temperature responsive microchip circuit preset for turning on and off at a predetermined temperature.

9. A transportable infrared food warming device comprising:

(a) at least one compartment having at least one food shelf and at least one opening for placing food to be warmed on said food shelf in said compartment;

(b) at least one infrared energy generating sheet positioned in said compartment adjacent to said at least one food shelf, said infrared energy sheet further comprising:

vi) a fiberglass support grid;

vii) a layer formed on said support grid, said layer comprising a mixture of carbon and polymeric materials capable of producing infrared radiation in response to electrical current passed therethrough;

viii) a pair of electrical conduction power strips along opposite sides of said layer;

ix) a polymeric laminate enclosing said support grid, said layer and said electrical conduction power strips, said polymetric laminate being substantially transparent to infrared radiation; and (c) an electrical power source connected to said input power strips for providing electrical power to be passed through said power strips and said layer of carbon polymer mixture to generate infrared radiation therefrom.

10. A transportable infrared food warming devices as in claim 9 further comprising:

(a) a power cord adapted to connect to a movable power source; and (b) a securing grommet attached to said compartment and to said power cord so that said cord is securely fastened to said food warming device.

* * * * *